United States Patent
Spangler et al.

(10) Patent No.: US 10,006,295 B2
(45) Date of Patent: Jun. 26, 2018

(54) GAS TURBINE ENGINE COMPONENT HAVING TRIP STRIPS

(71) Applicant: UNITED TECHNOLOGIES CORPORATION, Farmington, CT (US)

(72) Inventors: Brandon W. Spangler, Vernon, CT (US); Dominic J. Mongillo, West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 249 days.

(21) Appl. No.: 14/893,795

(22) PCT Filed: May 23, 2014

(86) PCT No.: PCT/US2014/039350
§ 371 (c)(1),
(2) Date: Nov. 24, 2015

(87) PCT Pub. No.: WO2015/023338
PCT Pub. Date: Feb. 19, 2015

(65) Prior Publication Data
US 2016/0102563 A1    Apr. 14, 2016

Related U.S. Application Data

(60) Provisional application No. 61/827,226, filed on May 24, 2013.

(51) Int. Cl.
*F01D 5/18* (2006.01)
*F01D 5/02* (2006.01)
(Continued)

(52) U.S. Cl.
CPC .............. *F01D 5/188* (2013.01); *F01D 5/02* (2013.01); *F01D 5/189* (2013.01); *F01D 9/041* (2013.01);
(Continued)

(58) Field of Classification Search
CPC ................................ F01D 5/188; F01D 5/189
(Continued)

(56) References Cited

U.S. PATENT DOCUMENTS 3,799,696 A    3/1974  Redman
4,064,300 A *  12/1977 Bhangu ............... F23R 3/002
                                                      428/120
(Continued)

FOREIGN PATENT DOCUMENTS

EP        1284338 A2   2/2003
WO     2011020485 A1   2/2011

OTHER PUBLICATIONS

Supplementary European Search Report for European Application No. 14836289.0 dated Dec. 16, 2016.
(Continued)

*Primary Examiner* — Logan Kraft
*Assistant Examiner* — Jason Fountain
(74) *Attorney, Agent, or Firm* — Carlson, Gaskey & Olds, P.C.

(57) ABSTRACT

Disclosed is a gas turbine engine including a compressor section and a turbine section. The gas turbine engine includes a gas turbine engine component having a first wall providing an outer surface of the gas turbine engine component and a second wall spaced-apart from the first wall. The first wall is a gas-path wall exposed to a core flow path of the gas turbine engine. The second wall is a non-gas-path
(Continued)

wall. A cooling passageway is provided between the second wall and the first wall. The second wall has a trip strip provided thereon.

21 Claims, 6 Drawing Sheets

(51) Int. Cl.
  *F01D 9/04* (2006.01)
  *F01D 25/12* (2006.01)
(52) U.S. Cl.
  CPC .......... *F01D 25/12* (2013.01); *F05D 2220/32* (2013.01); *F05D 2240/12* (2013.01); *F05D 2240/30* (2013.01); *F05D 2260/202* (2013.01); *F05D 2260/221* (2013.01); *F05D 2260/2212* (2013.01); *F05D 2260/22141* (2013.01); *Y02T 50/676* (2013.01)
(58) Field of Classification Search
  USPC ........................................................ 415/178
  See application file for complete search history.

(56) References Cited

U.S. PATENT DOCUMENTS

| | | | |
|---|---|---|---|
| 4,297,077 A | 10/1981 | Durgin et al. | |
| 4,474,532 A | 10/1984 | Pazder | |
| 4,753,575 A | 6/1988 | Levengood et al. | |
| 4,767,261 A | 8/1988 | Godfrey et al. | |
| 4,775,296 A | 10/1988 | Schwarzmann et al. | |
| 5,232,343 A | 8/1993 | Butts | |
| 5,361,828 A | 11/1994 | Lee et al. | |
| 5,403,159 A | 4/1995 | Green et al. | |
| 5,462,405 A | 10/1995 | Hoff et al. | |
| 5,586,866 A | 12/1996 | Wettstein | |
| 5,695,320 A | 12/1997 | Kercher | |
| 5,695,321 A | 12/1997 | Kercher | |
| 5,695,322 A | 12/1997 | Jacobson et al. | |
| 5,752,801 A | 5/1998 | Kennedy | |
| 6,183,192 B1 * | 2/2001 | Tressler | F01D 5/189 415/115 |
| 6,227,804 B1 | 5/2001 | Koga et al. | |
| 6,257,831 B1 | 7/2001 | Papple et al. | |
| 6,554,563 B2 * | 4/2003 | Noe | F01D 5/189 415/115 |
| 7,008,178 B2 * | 3/2006 | Busch | F01D 5/189 415/115 |
| 7,641,444 B1 | 1/2010 | Liang | |
| 7,862,291 B2 * | 1/2011 | Surace | F01D 9/041 415/115 |
| 7,955,053 B1 | 6/2011 | Liang | |
| 8,083,485 B2 | 12/2011 | Chon et al. | |
| 8,104,953 B2 * | 1/2012 | Van Suetendael | G01N 25/18 374/43 |
| 8,202,054 B2 | 6/2012 | Liang | |
| 8,348,613 B2 | 1/2013 | Gregg et al. | |
| 8,376,706 B2 * | 2/2013 | Bunker | F01D 5/187 416/96 R |
| 8,393,867 B2 | 3/2013 | Chon et al. | |
| 2015/0226085 A1 * | 8/2015 | Spangler | F01D 25/12 60/806 |

OTHER PUBLICATIONS

International Search Report for International Application No. PCT/US2014/039350 dated Mar. 9, 2015.
International Preliminary Report on Patentability for International Application No. PCT/US2014/039350 dated Dec. 3, 2015.

* cited by examiner

FIG. 10A SQUARE

FIG. 10B HALF-FILLETED

FIG. 10C FILLETED

FIG. 10D ROUND

GAS TURBINE ENGINE COMPONENT HAVING TRIP STRIPS

GOVERNMENT CONTRACT

This invention was made with government support under Contract No. FA8860-09-D-2923-0021 awarded by the United States Air Force. The government has certain rights in this invention.

BACKGROUND

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

Stationary vanes, and in particular those located in the turbine section, are cooled to increase performance and service life. One known cooling technique includes providing an internal cooling passageway circulating within the interior of the vane. The cooling passageway includes trip strips formed on the inner surface of an airfoil wall of the vane. In another known technique, known as impingement cooling, a baffle is provided in an internal cavity of the vane. The baffle includes a plurality of orifices for directing a flow of cooling air toward the inner surface of the airfoil wall of the vane.

SUMMARY

In one exemplary embodiment of this disclosure, a gas turbine engine includes a compressor section and a turbine section. The gas turbine engine includes a gas turbine engine component having a first wall providing an outer surface of the gas turbine engine component and a second wall spaced-apart from the first wall. The first wall is a gas-path wall exposed to a core flow path of the gas turbine engine. The second wall is a non-gas-path wall. A cooling passageway is provided between the second wall and the first wall. The second wall has a trip strip provided thereon.

In a further embodiment of any of the above, the gas turbine engine component is an airfoil assembly provided in one of the compressor section and the turbine section. Further, the first wall is an airfoil wall and the second wall is provided by a baffle. Further still, the passageway is provided between an outer surface of the baffle and an inner surface of the airfoil wall. The trip strip is provided on the outer surface of the baffle.

In a further embodiment of any of the above, the baffle is provided within a cavity provided by the airfoil wall.

In a further embodiment of any of the above, the baffle includes a plurality of trip strips.

In a further embodiment of any of the above, the plurality of trip strips are chevron-shaped, each including a first leg and a second leg joined at an apex.

In a further embodiment of any of the above, an axial flow of fluid is provided in the passageway, the axial flow of fluid flowing in an axial direction generally parallel to an engine central longitudinal axis.

In a further embodiment of any of the above, the plurality of trip strips are arranged such that the apexes point in the axial direction.

In a further embodiment of any of the above, a radial flow of fluid is provided in the passageway, the radial flow of fluid flowing in a radial direction generally perpendicular to an engine central longitudinal axis.

In a further embodiment of any of the above, the plurality of trip strips are arranged such that the apexes point in the radial direction.

In a further embodiment of any of the above, the plurality of trip strips are provided in a linear arrangement, and are arranged in a direction generally parallel to a vertical axis of the airfoil section.

In a further embodiment of any of the above, the plurality of trip strips are provided in a skewed arrangement, and are arranged in a direction angled relative to a vertical axis of the airfoil section.

In a further embodiment of any of the above, the airfoil wall provides a first cavity and a second cavity, the first cavity adjacent a leading edge of the airfoil section, the second cavity adjacent the trailing edge of the airfoil section.

In a further embodiment of any of the above, a first baffle is provided in the first cavity, and a second baffle is provided in the second cavity. Further, a first airfoil cooling passageway is provided between an outer surface of the first baffle and the inner surface of the airfoil wall, and a second airfoil cooling passageway is provided between an outer surface of the second baffle and the inner surface of the airfoil wall.

In a further embodiment of any of the above, the first baffle includes a plurality of first trip strips extending from the outer surface of the first baffle into the first passageway, and wherein the second baffle includes a plurality of second trip strips extending from the outer surface of the second baffle into the second passageway.

In another exemplary embodiment of this disclosure, an airfoil assembly includes an airfoil wall, a baffle, and an airfoil cooling passageway provided between an outer surface of the baffle and an inner surface of the airfoil wall. The outer surface of the baffle has a trip strip provided thereon.

In a further embodiment of any of the above, the baffle is provided within a cavity provided by the airfoil wall.

In a further embodiment of any of the above, an internal passageway is provided inside the baffle.

In a further embodiment of any of the above, the baffle includes a plurality of orifices to allow the internal passageway to communicate with airfoil cooling passageway.

In a further embodiment of any of the above, the trip strip is configured to disturb a flow of fluid in the airfoil cooling passageway.

In a further embodiment of any of the above, the baffle includes a plurality of trip strips, each of the plurality of trip strips provided by two legs joining at an apex to form a chevron-shape, each of the plurality of trip strips arranged such that the apex points in a direction opposite an expected direction of fluid flow in the first passageway.

In a further embodiment of any of the above, the airfoil assembly is a stator vane.

BRIEF DESCRIPTION OF THE DRAWINGS

The drawings can be briefly described as follows.

DETAILED DESCRIPTION

Figure 1:
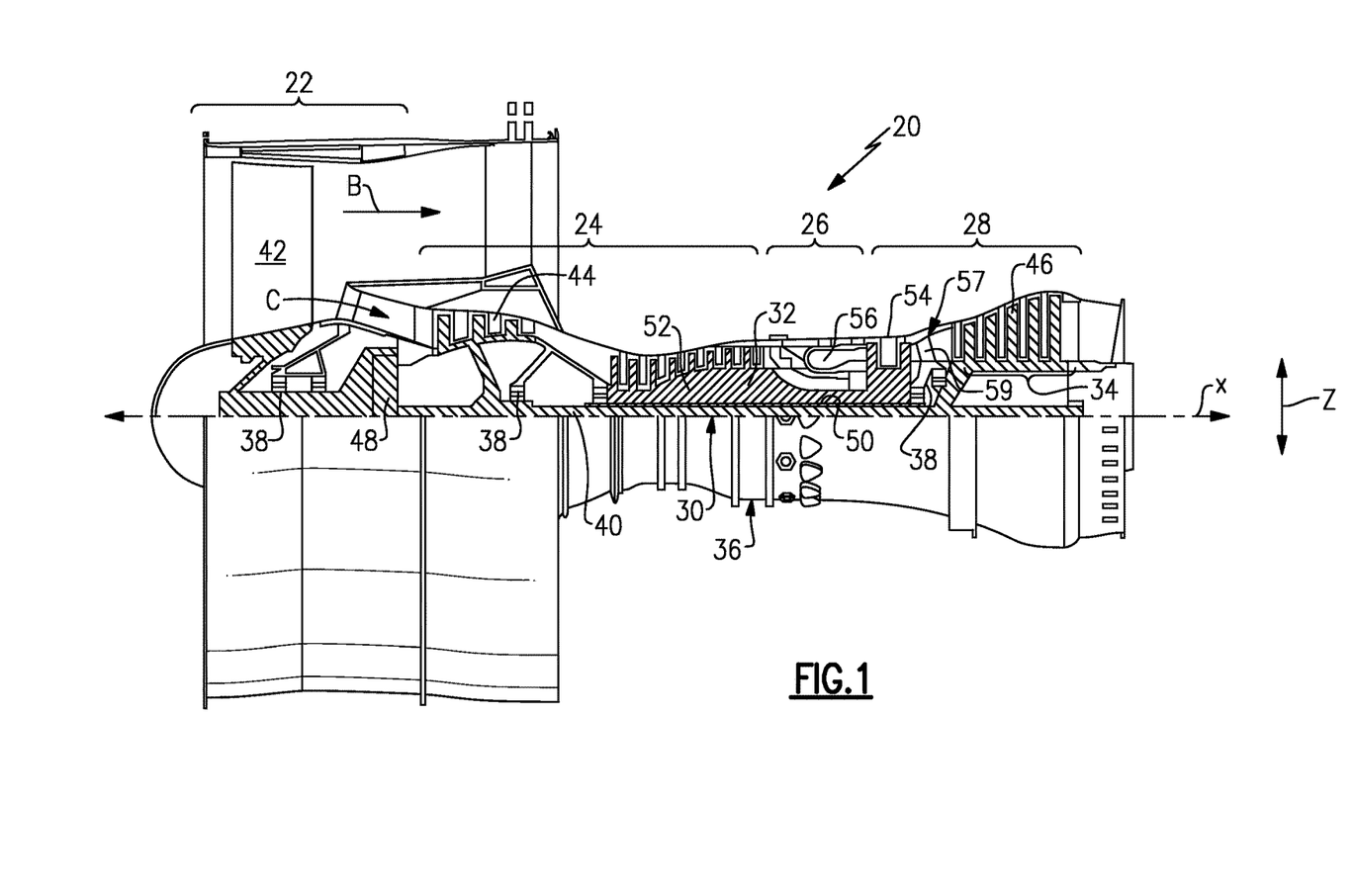
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section. The concepts disclosed herein can further be applied outside of gas turbine engines, such as in the context of wind turbines.

The example engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44, then by the high pressure compressor 52, mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFCT')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV")

system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °\ R)/(518.7°\ R)]^{0.5}$. The "Low corrected fan tip speed," as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
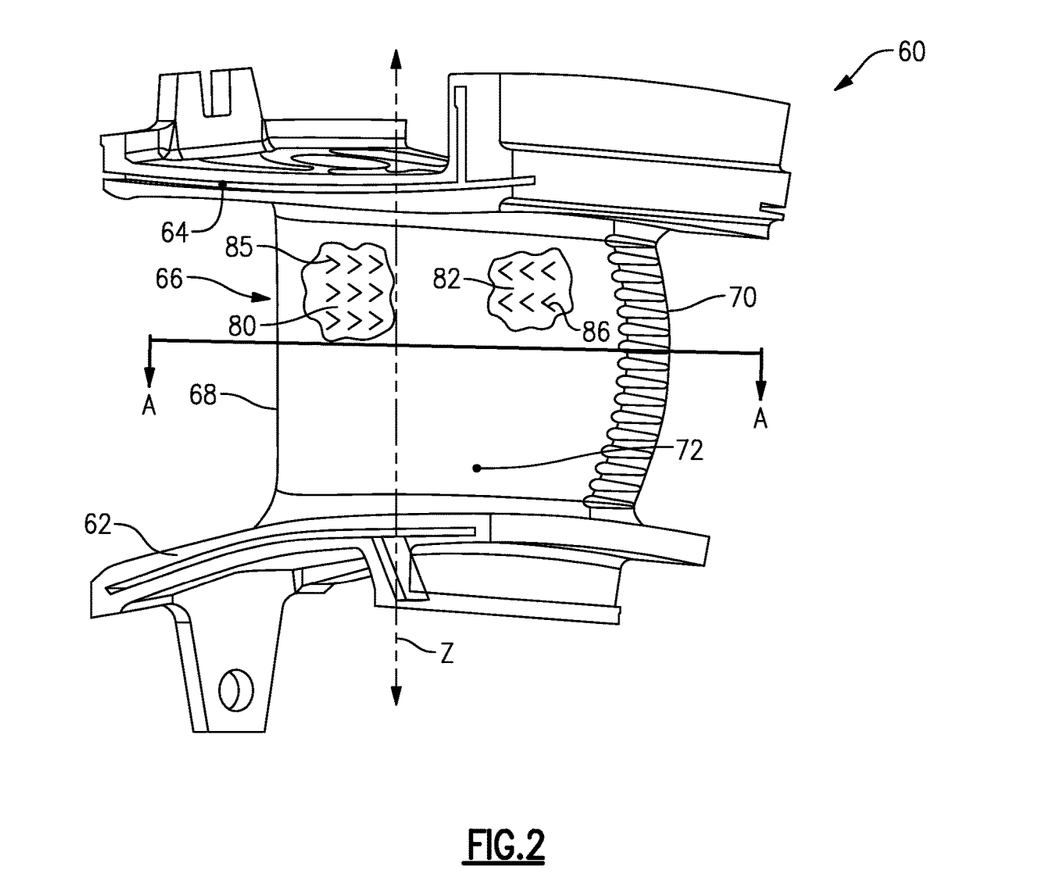
FIG. 2 is perspective view of an example airfoil assembly.

FIGS. 2-5 illustrate a first example airfoil assembly according to this disclosure. Turning to FIG. 2, the illustrated airfoil assembly is a stator vane 60, although this disclosure could extend to rotor blades, inlet guide vanes (e.g., the vanes 59 of the mid-turbine frame 57) or other airfoil structures, including blade outer air seals (BOAS). In the example of a BOAS, the BOAS would include cover plate having trip strips extending into a cooling passageway. The stator vane 60 may be arranged in either the compressor section 24, or the turbine section 28 of the engine 20. This disclosure may be particularly beneficial when used in the turbine section 28, as the stator vanes in the turbine section 28 are exposed to relatively high temperatures during operation of the engine 20.

The example stator vane 60 includes an inner platform 62, an outer platform 64, and an airfoil section 66 extending therebetween in a radial direction Z, which is generally perpendicular to the engine central longitudinal axis X. The airfoil section 66 further includes a leading edge 68, and a trailing edge 70.

Figure 3:
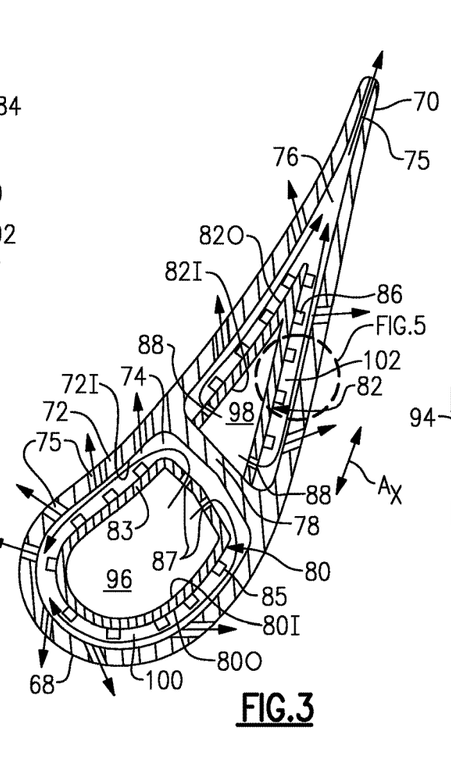
FIG. 3 is a sectional view taken along line A-A from FIG. 2.

With reference to FIG. 3, the airfoil section 66 includes an airfoil wall 72, which in this example is a gas-path wall, meaning the airfoil wall 72 is directly exposed to the core flow path of the engine 20. The airfoil wall 72 in turn provides first and second internal cavities 74, 76. The first and second cavities 74, 76 are adjacent the leading and trailing edges 68, 70 of the airfoil section 66, respectively, and are spaced apart by a lateral divider 78 in this example. The airfoil wall 72 further includes a plurality of openings 75 for allowing an internal flow of fluid to exit into the core flow path C of the engine 20.

Figure 4:
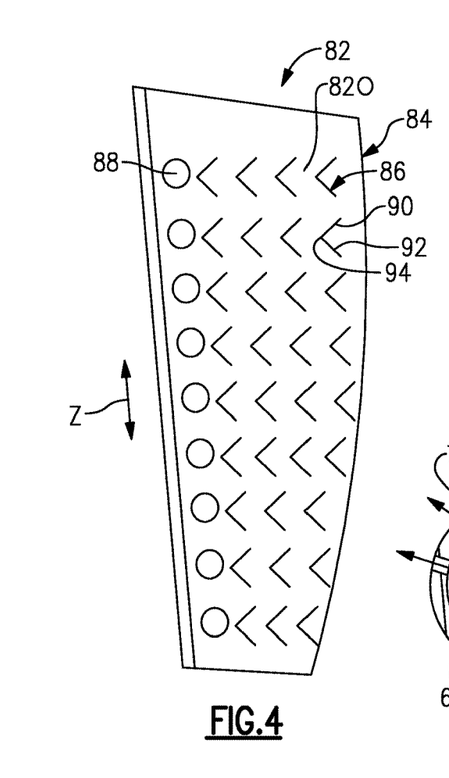
FIG. 4 is a side-view of a baffle of the example airfoil assembly.

First and second baffles 80, 82, are arranged within the first and second cavities 74, 76. An example baffle, in particular the second baffle 82, is shown in FIG. 4. While reference is made to the second baffle 82, it should be understood that the first baffle 80 has a similar arrangement. As illustrated, the second baffle 82 includes a wall 84 having a plurality of trip strips 86 on an outer surface 820 thereof facing an inner surface of the airfoil wall 72I, which is substantially smooth and free of trip strips. The wall 84 in this example is a non-gas path wall, and is not directly exposed to the core flow path of the engine 20. The second baffle 82 in this example also includes a plurality of orifices 88 at one axial end thereof. The plurality of orifices 88 are not needed in some examples, as will be discussed below relative to the embodiment of FIGS. 6-7.

Figure 8:
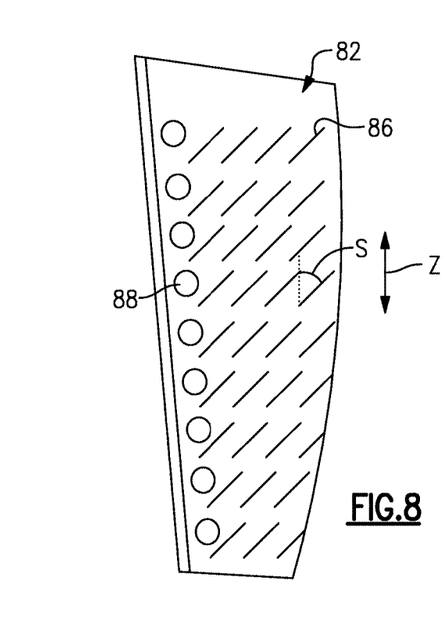
FIGS. 8-9 are side views of baffles having alternate trip strip arrangements.
Figure 9:
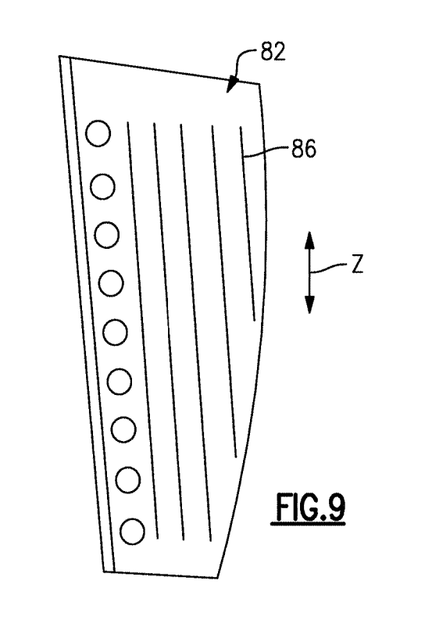
Figure 10A:
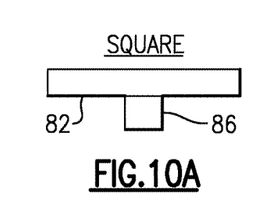
FIGS. 10A-10D illustrate example connections between the baffle wall and the trip strips.
Figure 10B:
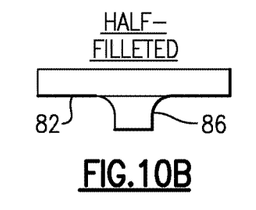
Figure 10C:
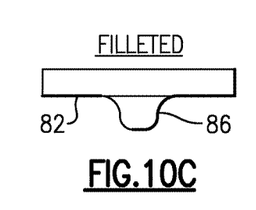
Figure 10D:
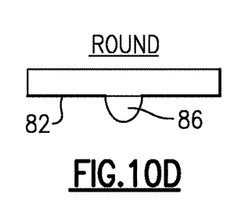

In this example, the plurality of trip strips 86 are chevron-shaped, each including a first leg 90 and a second leg 92 joined at an apex 94. The trip strips 86 may be either welded, stamped, coined (e.g., progressive coining), or formed (e.g., using hot or cold forming techniques) into the wall 84. While a chevron-shape is illustrated, differently shaped trip strips 86 come within the scope of this disclosure. Two alternative arrangements are illustrated in FIGS. 8-9.

As illustrated in FIG. 3, the first and second baffles 80, 82 provide a plurality of internal baffle passageways 96, 98 with inner surfaces thereof 801, 821. The first and second baffles 80, 82 are further arranged relative to the airfoil wall 72 to provide airfoil cooling passageways 100, 102 between outer surfaces 800, 820 thereof and an inner surface of the airfoil wall 72I. The trips strips 85, 86 of the first and second baffles 80, 82 extend outwardly from the outer surfaces 800, 820 of the first and second baffles 80, 82 into the respective airfoil cooling passageways 100, 102 to disturb a flow of fluid therein.

During operation of the engine 20, the internal baffle passageways 96, 98 are provided with a flow of cooling fluid in a generally radial direction Z (e.g., either in or out of the page relative to FIG. 3). With detailed reference to the second baffle 82, the cooling flow passes from the internal baffle passageway 98, through the orifices 88, and into the airfoil cooling passageway 102. The flow of fluid in the airfoil cooling passageway 102 is configured to flow in a generally axial direction $A_x$ between the orifices 88 and the trailing edge 70. The axial direction $A_x$ is generally parallel to the engine central longitudinal axis X.

Figure 5:
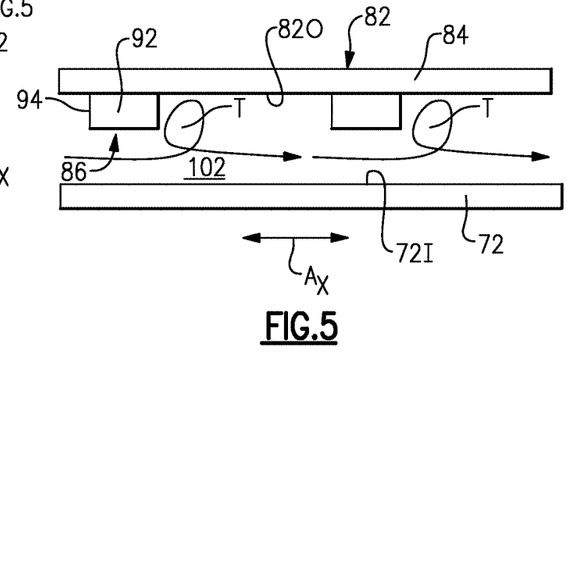
FIG. 5 shows the detail of the encircled area in FIG. 3.

As illustrated in FIG. 5, the flow of fluid in the airfoil cooling passageway 102 is disturbed by the trip strips 86. This disturbance creates turbulence, generally illustrated at T, which increases the local Mach number of the fluid in the airfoil cooling passageway 102, and improves the cooling of the airfoil wall 72. The outer surface 820 of the baffle may include geometries configured to generate additional turbulence in the airfoil cooling passageway 102.

In this example, the trip strips 86 are arranged on the second baffle 82 such that the apex 94 points toward the source of the fluid, in this case generally toward the orifices 88. This arrangement increases the ability of the trip strips 86 to disturb the flow of fluid in the airfoil cooling passageway 102. In other words, the trips strips 86 are arranged such that the apexes 94 point in a direction opposite the flow of the fluid in the airfoil cooling passageway 102. Likewise, relative to the first baffle 80, the fluid in the airfoil cooling passageway 100 flows generally from orifices 87 in the baffle wall 83, toward the leading edge 68 of the airfoil. Thus, the trip strips 85 of the first baffle 80 are arranged such that their apexes point toward the orifices 87 (e.g., generally in an opposite direction as the trip strips 86).

Figure 6:
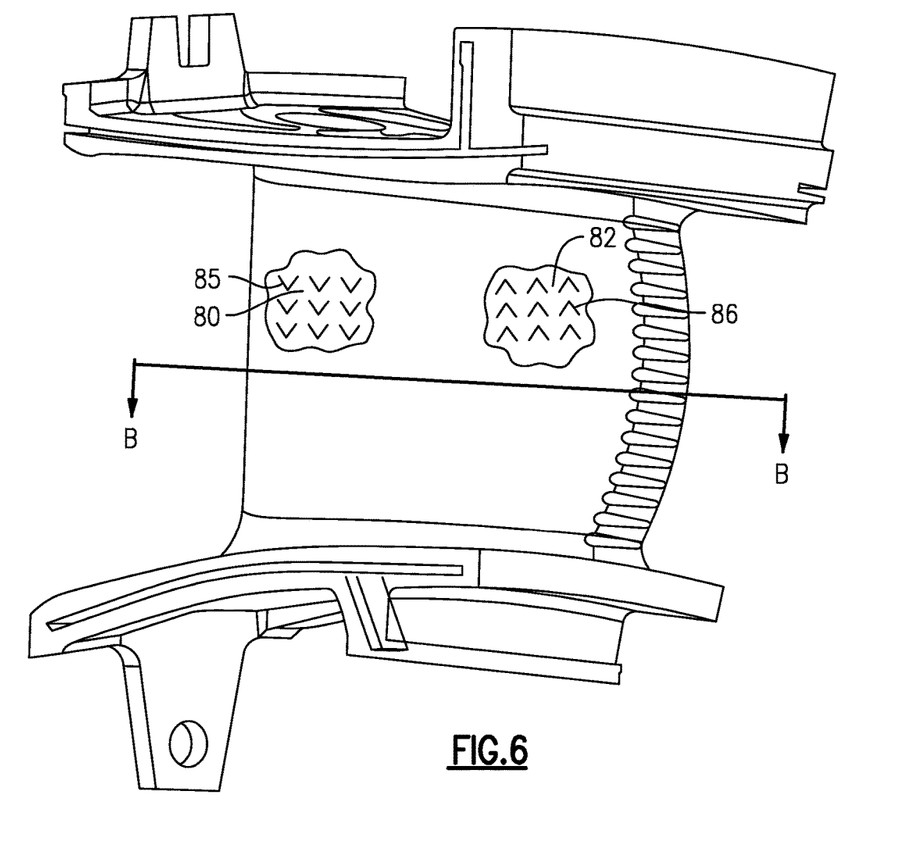
FIG. 6 is perspective view of another example airfoil assembly.
Figure 7:
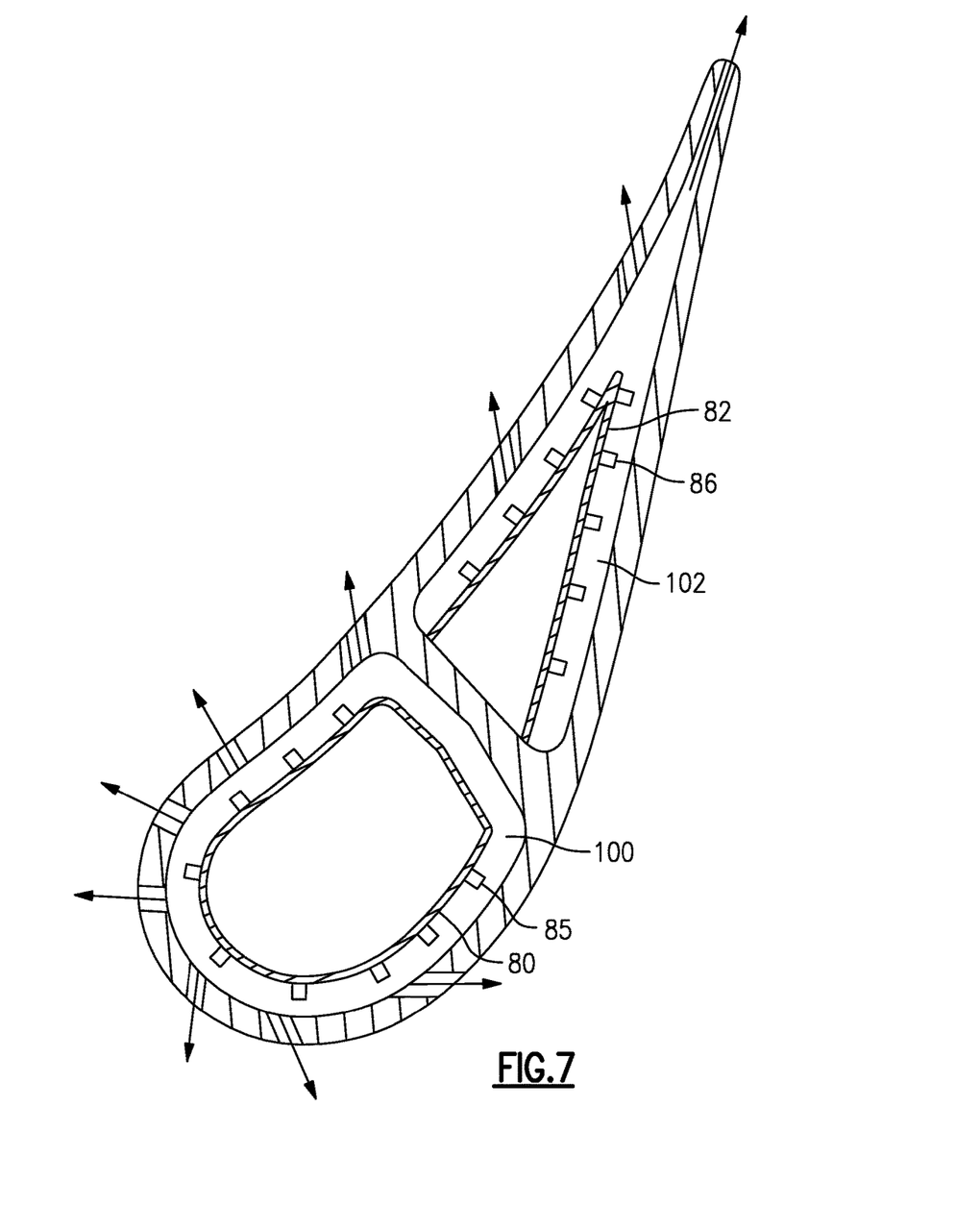
FIG. 7 is a sectional view taken along line B-B from FIG. 6.

While in the example of FIGS. 2-5, the trip strips 85, 86 are arranged for an axial flow of fluid in the airfoil cooling passageways 100, 102, FIGS. 6-7 illustrate another example in which the trip strips 85, 86 are arranged for a radial flow of fluid, either in or out of the page relative to FIG. 7, in the airfoil cooling passageways 100, 102. As illustrated in FIG. 6, the trips strips 85, 86 are chevron-shaped and are arranged such that their apexes point in a direction opposite the flow of the fluid in the airfoil cooling passageways. For instance, in one example the airfoil cooling passageway 100 receives a cooling flow in a direction out of the page relative to FIG. 7 (e.g., toward the outer platform 64), and the trip strips 85 of the first baffle 80 are arranged such that their apexes point in a generally radially inward direction (e.g., toward the inner platform 62). It should be understood that this application extends to examples where the flow of fluid in the airfoil cooling passageways 100, 102 flows both axially and radially. In such an example, fluid would be provided to the airfoil cooling passageways 100, 102 via the orifices 87, 88 and in a direction in-or-out of the page (relative to FIG. 3).

While chevron-shaped trip strips 86 are illustrated in FIGS. 2-7, FIGS. 8 and 9 illustrate two alternate trip strip arrangements, which can be used in either the example of FIGS. 2-5 or that of FIGS. 6-7. In FIG. 8, a skewed arrangement of trip strips is shown. In this example, the trip strips 86 are each angled relative to the radial direction Z at an angle S, which is less than 90 degrees, in the expected direction of fluid flow (here, to the right, relative to FIG. 8, away from the orifices 88). FIG. 9 illustrates a linear trip strip arrangement, wherein the trip strips 86 are arranged in a direction generally parallel to the radial direction Z. Additional trip strip configurations not illustrated in the Figures include segmented skewed, segmented chevron, double chevron, and criss-cross. It should be understood that this application is not limited to a particular trip strip type. The geometry (including height, width and pitch) of the trip strips may further be arranged as desired, and the spacing between trip strips can vary depending on the particular application.

With reference to FIGS. 10A-10D, the trip strips 86 may be attached to the baffle wall 82 with either square, half-filleted, filleted, or round configurations (respectively), to name a few examples, as desired depending on the particular application.

In one example, the stator vane 60 is initially formed by a forging process. When machining the forged stator vane 60, the cavities 74, 76 are formed by a plunge electrode, electron discharge machining (EDM), or water jetting. In either case, the inner surface of the airfoil wall 72 is relatively smooth, and does not include any raised features.

It may be relatively difficult to further machine the smooth inner surface 72I of the airfoil wall 72 to include raised features. In the illustrated example, the inner surface 72I is free of trip strips. Further, materials used for the airfoil wall 72 in some applications may be relatively brittle. Providing trip strips on the baffles 80, 82—rather than on the smooth inner surface of the airfoil wall 72I—provides a turbulence within the cavities 74, 76, such that the airfoil wall 72, and in turn the stator vane 60, can be effectively cooled, while also reducing the stress concentrations on the airfoil wall 72.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A gas turbine engine, comprising: a compressor section; a turbine section; and
a gas turbine engine component having a first wall providing an outer surface of the gas turbine engine component and a second wall spaced-apart from the first wall, the first wall being a gas-path wall exposed to a core flow path of the gas turbine engine, the second wall being a non-gas-path wall, a cooling passageway provided between the second wall and the first wall, the second wall having a trip strip provided thereon, wherein the trip strip is chevron-shaped and includes a first leg and a second leg joined at an apex, the apex arranged to point in a direction substantially opposite a direction of fluid flow within the cooling passageway; wherein the trip strip is only in contact with the second wall.

2. The gas turbine engine as recited in claim 1, wherein the gas turbine engine component is an airfoil assembly provided in one of the compressor section and the turbine section, wherein the first wall is an airfoil wall and the second wall is provided by a baffle, wherein the passageway is provided between an outer surface of the baffle and an inner surface of the airfoil wall, and wherein the trip strip is provided on the outer surface of the baffle.

3. The gas turbine engine as recited in claim 2, wherein the baffle is provided within a cavity provided by the airfoil wall.

4. The gas turbine engine as recited in claim 3, wherein the baffle includes a plurality of said trip strips.

5. The gas turbine engine as recited in claim 4, wherein an axial flow of fluid is provided in the passageway, the axial flow of fluid flowing in an axial direction generally parallel to an engine central longitudinal axis.

6. The gas turbine engine as recited in claim 5, wherein the plurality of trip strips are arranged such that the apexes point in the axial direction.

7. The gas turbine engine as recited in claim 4, wherein a radial flow of fluid is provided in the passageway, the radial flow of fluid flowing in a radial direction generally perpendicular to an engine central longitudinal axis.

8. The gas turbine engine as recited in claim 7, wherein the plurality of trips strips are arranged such that the apexes point in the radial direction.

9. The gas turbine engine as recited in claim 4, wherein the plurality of trip strips are provided in a linear arrangement, and are arranged in a direction generally parallel to a vertical axis of the airfoil section.

10. The gas turbine engine as recited in claim 4, wherein the plurality of trip strips are provided in a skewed arrangement, and are arranged in a direction angled relative to a vertical axis of the airfoil section.

11. The gas turbine engine as recited in claim 2, wherein the airfoil wall provides a first cavity and a second cavity, the first cavity adjacent a leading edge of the airfoil section, the second cavity adjacent the trailing edge of the airfoil section.

12. The gas turbine engine as recited in claim 11, including a first baffle provided in the first cavity, and a second baffle provided in the second cavity, wherein a first airfoil cooling passageway is provided between an outer surface of the first baffle and the inner surface of the airfoil wall, and wherein a second airfoil cooling passageway is provided between an outer surface of the second baffle and the inner surface of the airfoil wall.

13. The gas turbine engine as recited in claim 12, wherein the first baffle includes a plurality of first trip strips extending from the outer surface of the first baffle into the first passageway, and wherein the second baffle includes a plurality of second trip strips extending from the outer surface of the second baffle into the second passageway.

14. The gas turbine engine as recited in claim 1, wherein an inner surface of the first wall is substantially smooth and free of any raised features.

15. An airfoil assembly, comprising: an airfoil wall; a baffle;
an airfoil cooling passageway provided between an outer surface of the baffle and an inner surface of the airfoil wall, the outer surface of the baffle having a trip strip provided thereon, wherein the trip strip is chevron-shaped and includes a first leg and a second leg joined at an apex, the apex arranged to point in a direction substantially opposite a direction of fluid flow within the cooling passageway; wherein the trip strip is only in contact with the baffle.

16. The airfoil assembly as recited in claim 15, wherein the baffle is provided within a cavity provided by the airfoil wall.

17. The airfoil assembly as recited in claim 16, including an internal passageway provided inside the baffle.

18. The airfoil assembly as recited in claim 17, wherein the baffle includes a plurality of orifices to allow the internal passageway to communicate with airfoil cooling passageway.

19. The airfoil assembly as recited in claim 18, wherein the trip strip is configured to disturb a flow of fluid in the airfoil cooling passageway.

20. The airfoil assembly as recited in claim 16, wherein the baffle includes a plurality of said trip strips.

21. The airfoil assembly as recited in claim 15, wherein an inner surface of the airfoil wall is substantially smooth and free of any raised features.

\* \* \* \* \*